United States Patent [19]

Legg

[11] Patent Number: 4,680,851
[45] Date of Patent: Jul. 21, 1987

[54] METHOD OF SETTING UP ROTARY SLITTER TOOLING

[75] Inventor: Gene A. Legg, Lumberport, W. Va.

[73] Assignee: Alcan Aluminum Corporation, Cleveland, Ohio

[21] Appl. No.: 855,530

[22] Filed: Apr. 22, 1986

[51] Int. Cl.$^4$ ............................................. B23P 19/04
[52] U.S. Cl. ........................................ 29/433; 29/465; 76/101 A; 83/13; 83/664; 83/675
[58] Field of Search ............................ 83/13, 664, 675; 33/180 R, 186, 185 R; 29/433, 465; 76/101 A

[56] References Cited

U.S. PATENT DOCUMENTS

| | | | |
|---|---|---|---|
| 2,613,571 | 10/1952 | Herman | 83/664 X |
| 3,359,842 | 12/1967 | Young | 83/664 X |
| 3,613,485 | 10/1971 | Kelly et al. | 76/101 A |
| 4,195,542 | 4/1980 | Zimmer | 83/664 |
| 4,388,753 | 6/1983 | Brookes | 29/433 |
| 4,597,152 | 7/1986 | Hamisch, Jr. | 29/433 |

FOREIGN PATENT DOCUMENTS 957307 5/1964 United Kingdom ................. 83/664

Primary Examiner—Frank T. Yost
Attorney, Agent, or Firm—Cooper, Dunham, Griffin & Moran

[57] ABSTRACT

A method of setting up tooling on parallel rotary arbors for cutting plural parallel longitudinal slits in a web of sheet material advancing between the arbors, using a set of tooling comprising multiple circular cutter elements and multiple circular spacer elements, the elements having various nominal axial lengths with a common axial length tolerance of ±t. Each element, measured to determine the deviation between its actual and nominal axial length, is detectably identified (e.g. by color coding) with one of plural discrete successive subranges of the overall tolerance range ±t, viz., with that subrange in which its measured axial length deviation lines. A first group of the elements for mounting on a given axial portion of an arbor, and a second group of the elements for mounting on a corresponding axial portion of the other arbor in register with the given axial portion, are selected such that the sum of the first-group element nominal axial lengths equals the sum of the second-group element nominal axial lengths plus a predetermined value, and such that the first-group element axial length deviations lie in subranges that cumulatively balance the subranges in which the second-group element axial length deviations lie, for limiting the difference between the sum of the first-group deviations and the sum of the second-group deviations to a predetermined range of values; and the selected groups of elements are mounted on the respective arbors, the selecting and mounting steps being repeated to assemble a complete array of tooling elements.

12 Claims, 5 Drawing Figures

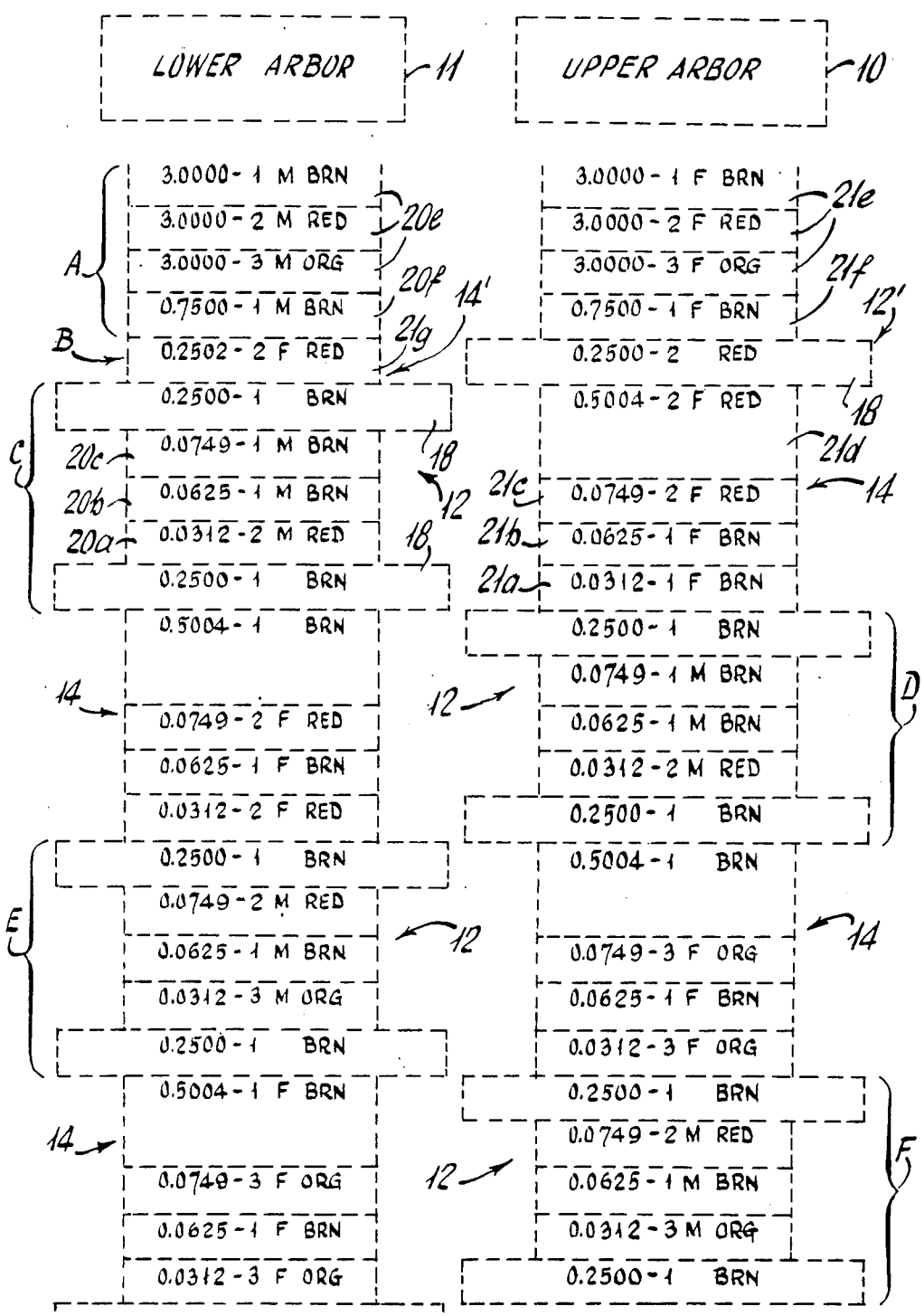

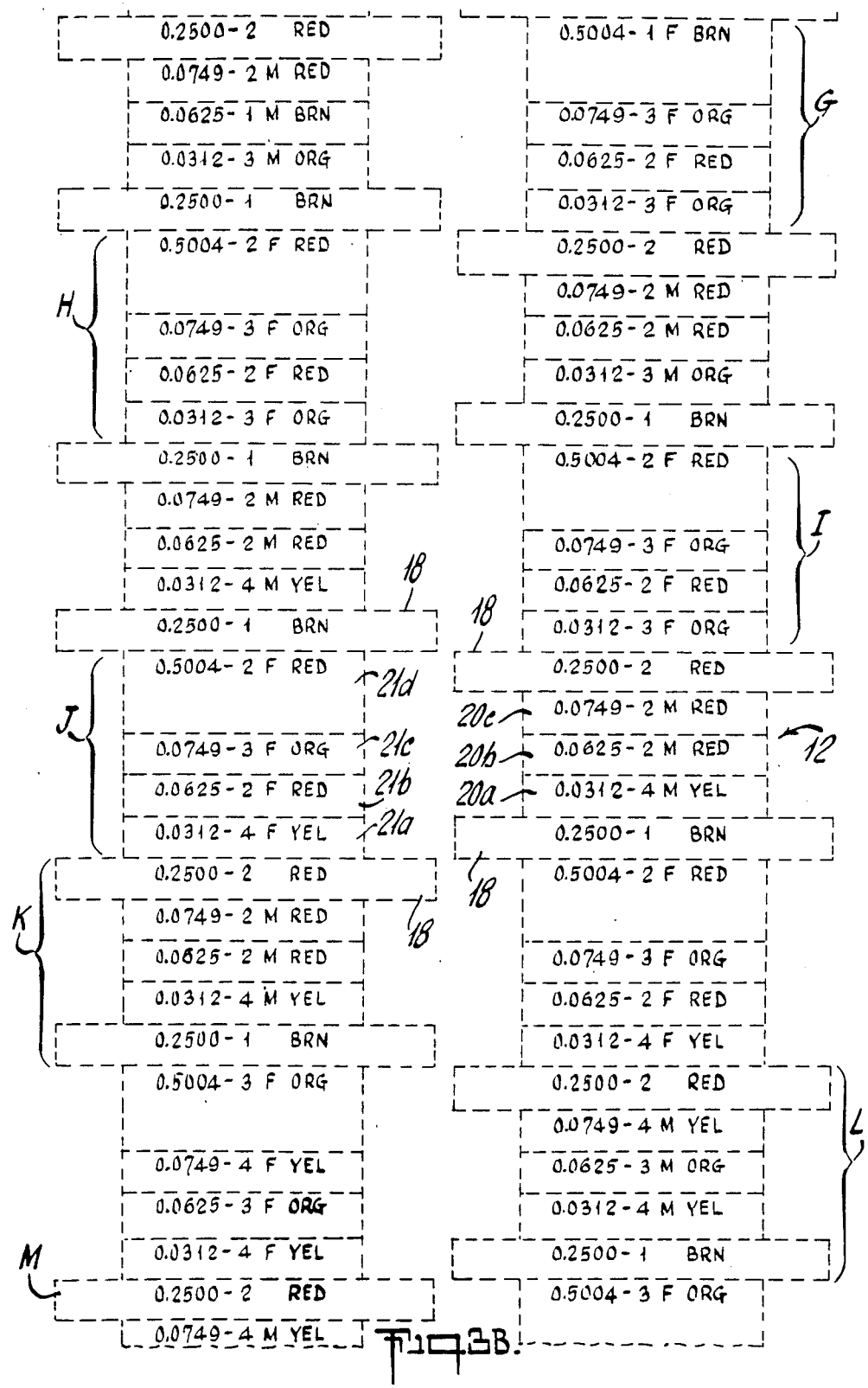

4,680,851

METHOD OF SETTING UP ROTARY SLITTER TOOLING

BACKGROUND OF THE INVENTION

This invention relates to methods of setting up tooling in rotary cutting equipment for slitting sheet material such as light-gauge metal strip and the like. More particularly, it is directed to tooling set-up methods for slitting equipment wherein a web or strip of sheet material is advanced between axially parallel arrays of rotary knives which cooperatively cut plural continuous parallel longitudinal slits in the strip.

An example of such equipment, to which detailed reference will be made herein for purposes of illustration, is a rotary slitter used in the production of narrow metal strips (e.g. for making products such as shutter or venetian blind slats, radiator fins, etc.) from light-gauge cold rolled aluminum alloy strip. The slitter includes upper and lower axially parallel driven arbors each bearing a number of rotary knives spaced along its length. As the strip to be slit is advanced longitudinally between the arbors, in a direction perpendicular to the plane of the arbor axes, the knives coact to cut a plurality of uniformly spaced longitudinal slits in the strip and thereby to divide the strip into a corresponding plurality of narrow strips of uniform width. These narrow strips may be coiled and/or subjected to subsequent operations such as roll-forming, painting, and cutting to desired final product lengths.

Typically, the arrays of parallel knives are constituted of tooling carried on each arbor and arranged to provide plural radially projecting circular knives spaced apart by gaps along the arbor axis. The projecting knives (herein termed male knives) on each arbor are disposed in register with the gaps (herein termed female knives) on the other arbor, and are slightly shorter in axial length than the famale knives. Thus, with the arbors so positioned that the male knives intersect the major surface planes of the entering work (metal strip), each outer side edge of a male knife on one arbor is juxtaposed in closely proximate but non-interfering relation to an outer side edge of a male knife on the other arbor, for cooperation therewith to cut a slit in the strip.

The attainment of proper cutting action is critically dependent on the axial clearance (spacing along the arbor axes) between each cooperating pair of slit-cutting male knife edges. Accordingly, the axial length of each male and female knife must be controlled within very close tolerances. One way of meeting this tolerance requirement is to provide the complete tooling for each arbor as a single integral preformed unit of alternating male and female knives, fixed or removably mountable on the arbor; such units can be machined to the requisite tolerances, although their production is costly and time-consuming. With integral preformed tooling units, however, the spacing between adjacent slits and also the axial clearance between cooperating pairs of male knife edges are invariable, so that they are usable only as dedicated tooling for the fabrication of a single product, viz. to cut slits of given spacing in strip of a given gauge, hardness and alloy composition. When the same slitting equipment must be used to fill multiple relatively small orders for a variety of different products, necessitating frequent tooling changes, the expense and time required to provide dedicated tooling for each product would be prohibitive.

It is therefore preferred, in many instances, to employ so-called universal tooling comprising a set of separate large-diameter circular cutter and male spacer elements and small-diameter circular collar or female spacer elements that can be individually mounted in desired sequence on an arbor to make up an alternating array of male and female knives, with additional male and/or female spacers provided at the ends of the array. In an illustrative universal tooling set, the cutters are machined to a uniform nominal axial length, while male and female spacers are provided in a multiplicity of different nominal axial lengths; each male knife is constituted of two cutters spaced apart axially by one or more (usually several) male spacers, while each female knife is made up of one or more (again, usually several) female spacers. Slit spacing may readily be varied, at least over a substantial range, by varying the number and/or nominal lengths of the spacers used in the male and female knives. The cutters and spacers, being keyed on an arbor in end-to-end abutting relation to each other, stably maintain the position and length of each male and female knife they comprise. Conveniently, the universal tooling set includes two cutters, and at least two spacers of each nominal axial length, for each slit to be cut.

The provision of requisite close knife-length tolerances with universal tooling has heretofore presented substantial difficulty. It is feasible to machine the individual cutters and spacers to reasonably small axial-length tolerances, but the cost of the tooling increases as the permitted tolerances are reduced. As a general rule, the large multiplicity of these elements constituting a complete universal tooling set will include a substantially equal distribution of elements above and below nominal length, i.e. within the individual length-tolerance limits of the elements. There is, however, no assurance that the particular elements selected to make up the male and female knives on the two arbors of a slitter will exhibit a like distribution. Thus, ordinary set-up procedures may happen to result in a preponderance of above-nominal tooling elements on one arbor and a preponderance of below-nominal elements on the other arbor. Within the practicable limits of individual tooling element tolerances, differences between the accumulated tolerances on the two arbors can readily result in unacceptable failure to achieve the very precise axial clearance required between cooperating pairs of male knife edges; the likelihood such misalignment increases with the number of slits to be cut. To compensate for unbalanced accumulated tolerances in universal tooling set up, it has frequently been necessary to resort to such inconvenient expedients as the use of field-fit thin plastic shims, especially in setting up tooling to cut a substantial plurality of slits.

SUMMARY OF THE INVENTION

The present invention broadly contemplates the provision of improvements in a method of setting up tooling on two axially parallel driven rotary arbors for cutting plural parallel longitudinal slits in a web of sheet material advancing between the arbors in a direction transverse to the axes of the arbors, using a set of tooling comprising a multiplicity of circular tooling elements individually mountable on either arbor an including cutter elements and male spacer elements both of the same given diameter and collar or female spacer elements of smaller diameter than the cutter and male spacer elements, each tooling element of the set having a predetermined nominal axial length and an actual axial length deviating from its nominal length within a tolerance range of $\pm t$, where t is an absolute value of length. The tooling set-up method to which the invention relates includes the steps of selecting a first group of tooling elements from the set for mounting on a given axial portion of one of the arbors, and a second group of elements from the set for mounting on a corresponding axial portion of the other arbor in register with the given axial portion of the one arbor, such that the sum of the nominal axial lengths of the first-group elements equals the sum of the nominal axial lengths of the second-group elements plus a predetermined value K (which may be positive, negative, or zero), the first group consisting of a predetermined number of elements and the second group consisting of a predetermined number of elements; and mounting the first-group elements and the second-group elements respectively on the given portion of the one arbor and on the corresponding portion of the other arbor.

In accordance with the invention, and as particular features thereof, each of the tooling elements of the set is detectably identified with one of a plurality of defined, discrete, successive subranges of the tolerance range $\pm t$, in accordance with the sign and absolute magnitude of the deviation $d_e$ between measured value of actual axial length of the element and the nominal axial length of the element, these subranges being so defined that the value of $d_e$ of any given element of the set lies within one of the subranges, and each element of the set being identified with that one of the subranges in which its value of $d_e$ lies; and the selecting step includes selecting, as the elements of the first and second groups, elements identified as aforesaid with particular ones of the subranges such that the subranges with which the first-group elements are identified cumulatively balance the subranges with which the second-group elements are identified for limiting the difference D between the sum of the values $d_e$ of the first-group elements and the sum of the values $d_e$ of the second-group elements to a predetermined range of values of D.

Advantageously, and preferably, the method of the invention is employed for setting up each male knife on one arbor and the facing female knife on the other arbor. That is to say, the first-group elements are selected to constitute a male knife comprising a pair of cutter elements spaced apart by at least one of the male spacer elements, and the second-group elements are selected to constitute a female knife, comprising at least one of the collar or female spacer elements, dimensioned for register with the male knife. The method is also applied to setting up the spacer elements that are disposed between the arrays of knives and the ends of the arbors; thus, in a complete tooling set-up procedure employing the present method, initially the given portion of the one arbor (on which a first selected group of tooling elements is mounted) is at one extremity of the arbor, and the selecting and mounting steps are repeated, for successive axial portions of the arbors, until a complete array of tooling has been mounted over the full length of each arbor. This complete array of tooling constitutes a plurality of male knives and a plurality of female knives disposed in alternating succession on each arbor, such that the male knives on one arbor are in register with the female knives on the other arbor, each female knife and the male knive in register therewith being set up (in accordance with the invention) by performing the above-described selecting and mounting steps with the first-group elements selected to constitute the male knife and the second-group elements selected to constitute the female knife. Typically or preferably, the value of K is less than zero for each first group of elements selected to constitute male knife.

As a further particular feature of the invention, the subranges (of the total tolerance range $\pm t$) are substantially equal to each other in extent, expressed as units of lengths. Still more particularly, in especially advantageous embodiments of the invention, wherein the number of subranges is q, successive subranges of progressively increasing value are respectively designated by consecutive integers V ranging from 1 to q such that $V=1$ designates the subrange including $d_e=-t$ and $V=q$ designates the subrange including $d_e=+t$; to each element of the set there is assigned that integer V which designates the subrange in which the value $d_e$ of the element lies; and the step of selecting elements identified with particular subranges (to achieve cumulative balancing of subranges) comprises selecting the elements of the first and second groups such that the sum of the integers V assigned to the first-group elements equals the sum of the integers V assigned to the second-group elements.

In illustrative or preferred examples of such embodiments, the extent of each subrange is substantially equal to $2t/q$, and q is an odd integer. Using $M_1$ and $M_2$ respectively to designate the numbers of elements in the first and second groups, the values of q, $M_1$ and $M_2$ are selected such that $[(M_2-M_1)(q+1)\pm(M_1+M_2)]t/q$ substantially coincides with the aforementioned predetermined range of D values.

In the practice of the present method, as in conventional procedures for setting up universal tooling, the tooling elements are presorted in accordance with (and/or otherwise rendered identifiable by) their differing nominal axial lengths so as to facilitate selection of spacers of desired nominal lengths during assembly of the tooling. As a still further particular feature of the invention, each tooling element is provided with a detectable indicium (e.g., by color coding) of the subrange in which its axial length deviation lies, thereby to enable identification of tooling elements having deviations within particular subranges, for achieving the aforementioned cumulative subrange balancing in the selection of the first-group and second-group elements.

In another aspect, the invention contemplates the provision of a method of preparing a set of tooling (of the type described above) for setting up on two axially parallel driven rotary arbors as aforesaid, comprising measuring the actual axial length of each tooling element of the set for determining the sign and absolute magnitude of the deviation $d_e$ between the actual and nominal axial lengths of the element, to enable differentiation of the determined deviations $d_e$ of the elements of the set into at least q discrete, successive subranges of the overall axial length tolerance range $\pm t$ (to which each element is machined), where q is an integer greater than 1, and the subranges are substantially equal to each other in extent; assigning, to each measured element, in integer V within a set of consecutive integers ranging from 1 to q, by respectively designating the successive subranges by successively larger integers V such that $V=1$ designates the subrange including $d_e=-t$ and $V=q$ designates the subrange including $d_e=+t$, and determining the integer V to be assigned to any given measured element as that integer V designating the subrange within which the deviation $d_e$ of the given element lies; and providing each element of the set with a detectable indication (e.g. color coding indicium) of the integer V assigned to it, thereby to enable elements to be selected from the set in accordance with their respective assigned integers V.

In a still further aspect, the invention embraces a method of setting up tooling on axially parallel arbors including, in combination, the steps just described for preparing the tooling, the step of selecting first and second groups of elements, for mounting on a given portion of one of the arbors and on a corresponding portion of the other arbor in register with the given portion, respectively, such that the sum of the nominal axial lengths of the first-group elements equals the sum of the nominal axial lengths of the second-group elements plus a predetermined value K, and such that the sum of the integers V assigned to the first-group elements equals the sum of the integers V assigned to the second-group elements; and the step of mounting the first and second groups of elements on the arbor portions for which they are respectively selected.

As will now be understood, the methods of the present invention enable universal tooling to be set up, in sheet-slitting equipment of the type described above, with sufficiently close matching of the tooling length tolerances respectively accumulated on the two arbors of the equipment to assure proper axial clearance between cooperating pairs of slit-cutting male knife edges. This matching is achieved by the present methods in a manner which is simple, reliable, expeditious, and which avoids the necessity of using field-fit shims. Additionally, these methods of the invention afford matching of accumulated tooling-length tolerances, with tooling elements machined to given individual length tolerances, equivalent to that attainable by conventional set-up procedures with tooling elements having substantially closer individual length tolerances, thereby enabling minimization of tooling element production costs. For example, where each of q subranges (into which the tooling elements are classified in accordance with the determined values of their deviations $d_e$) has an extent (in units of length) substantially equal to $2t/q$, cooling machined to a length tolerance of $\pm t$ sets up, by the method of the invention, with a matching of accumulated tolerances equivalent to that attainable by conventional set-up procedures with tooling machined to a tolerance of about $\pm t/q$.

Further features and advantages of the invention will be apparent from the detailed description hereinbelow set forth, together with the accompanying drawings.

BRIEF DESCRIPTION OF THE DRAWINGS

FIGS. 3A, 3B and 3C are successive portions of a diagrammatic representation of a specific illustrative example of tooling set-up in accordance with the invention.

DETAILED DESCRIPTION

The invention will be described as embodied in methods of preparing and setting up tooling for rotary slitter equipment arranged to cut a plurality of equally spaced continuous longitudinal slits in a continuously advancing web or strip of light-gauge aluminum alloy sheet, thereby to divide the strip into a plurality of uniform narrower strips for subsequent fabrication into narrow-strip products or articles such as venetian blind slats, shutter slats, or radiator fins.

Figure 1:
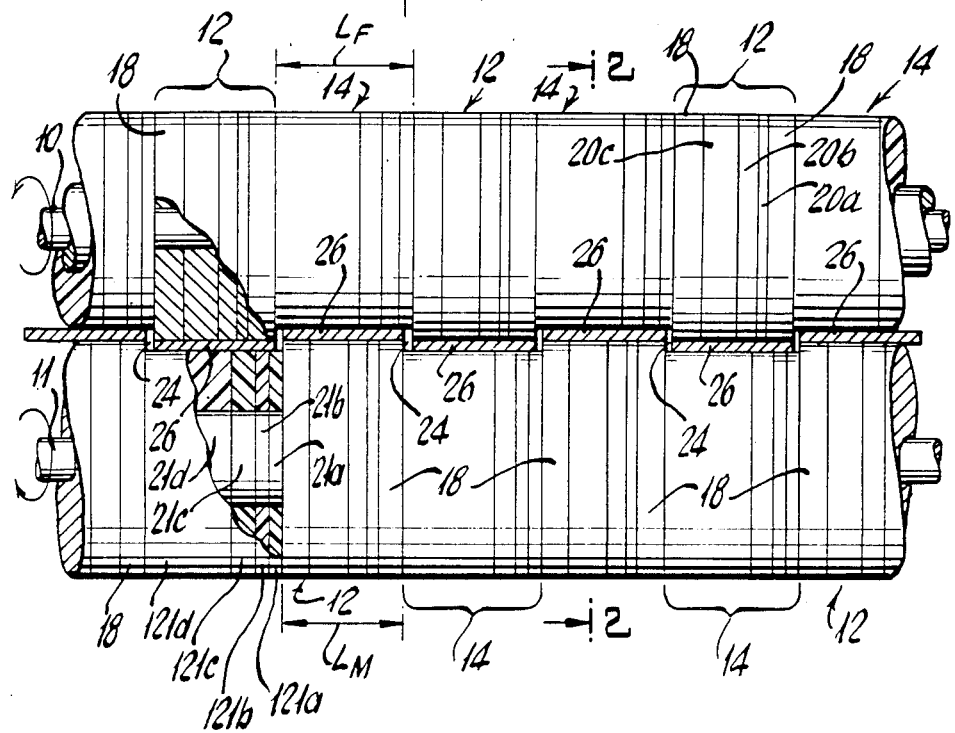
FIG. 1 is a simplified, schematic fragmentary front elevational view (not to scale) of the arbors and mounted tooling of sheet-slitting equipment with which the method of the present invention may be practiced.
Figure 2:
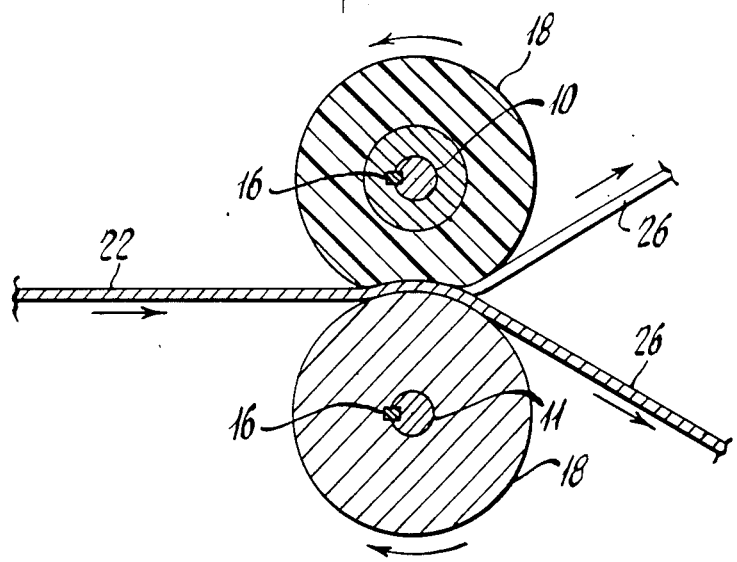
FIG. 2 is a sectional side elevational view taken along the line 2—2 of FIG. 1.

As illustrated in FIGS. 1 and 2, a slitter of this type includes an upper horizontal arbor 10 and a lower horizontal arbor 11 mounted in vertically spaced, axially parallel relation to each other and connected to be rotated by suitable drive means (not shown). Each of the arbors carries tooling constituting a plurality of male rotary knives 12 and female knives 14 arranged in alternating succession along the length of the arbor; each male knife 12 on one arbor is in register with a female knife 14 on the other arbor, and has an axial length $L_m$ (FIG. 1) slightly shorter than the axial length $L_f$ of the female knife 14 with which it is in register.

The knives are made up of circular tooling elements each mounted coaxially on one of the arbors and having a central hole through which the arbor extends, the tooling element hole and the arbor cross-section being shaped for keying interengagement (as indicated at 16 in FIG. 2) such tht the tooling element rotates with the arbor. Several types of tooling elements are provided, viz. cutter elements 18 of relatively large outer diameter, male spacer elements 20a, 20b, 20c, etc., having the same outer diameter as the cutter elements, and collar or female spacer elements 21a, 21b, 21c, etc., having an outer diameter substantially smaller than that of the cutter and male spacer elements. Typically, all these tooling elements are made of hardened tool steel, and the female spacer elements bear surrounding cylindrical sleeves 121a, 121b, 121c, etc., constituted of suitably hard and dimensionally stable yet somewhat compressible material, e.g. polyurethane.

In an exemplary array of such tooling, the cutters 18, the male spacers 20a, 20b, 20c, etc., and the polyurethane sleeves 121a, 121b, 121c, etc. (respectively secured to the female spacers 21a, 21b, 21c, etc.) all have the same outer diameter, e.g. eight inches. During use, the sleeves are compressively deformed by the male knives and the strip being slit, so that the strip is firmly clamped between the sleeves and the male knives as slitting occurs. It will be understood that all axial length measurements and dimensions given or mentioned herein for the female spacers refer to the axial lengths of the central steel collars or spacer elements 21a, 21b, 21c, etc., and not to their surrounding polyurethane sleeves; as will also be appreciated, for simplicity and clarity of illustration, in FIG. 1 the axial length dimensions of all the tooling elements are proportionately greatly exaggerated.

Each male knife 12 (except for the extreme end knives, as explained below) consists of two cutter elements 18 spaced apart by one or more of the male spacer elements (three in FIG. 1), while each female knife 14 consists of one or more female spacer elements (four in FIG. 1). At each extremity of the array of knives on the two arbors, the male knife which is closest to the adjacent ends of the arbors may be constituted of a single cutter element, and both end portions of each arbor, beyond the array of knives, commonly carry additional male and/or female spacer elements which serve as centering spacers; these features of the end portions of the tooling set-up are not shown in FIGS. 1 and 2 but are represented diagrammatically in FIGS.

3A and 3C. As will be understood, to mount the tooling on the arbors, the cutter and spacer elements for each arbor are slipped in sequence over an end of the arbor and disposed thereon in end-to-end abutting relation to each other until a complete positionally stable array of tooling elements has been established on the arbor.

In the use of the slitter to cut slits in a light-gauge aluminum alloy strip 22 (FIG. 2), the strip is continuously advanced (by suitable conventional means, not shown) between the arbors, in a direction perpendicular to the vertical planes containing the arbox axes and with the strip major surfaces lying substantially in horizontal planes, while the arbors are continuously rotated by the aforementioned drive means. The arbors are spaced apart by such a distance that the cutter elements 18 of the male knives 12 intersect the major surface planes of the entering strip 22. Since each male knife on one arbor is in register with (but slightly shorter in axial length than) a female knife on the other arbor, and since each female knife serves to space apart two male knives mounted on the same arbor as the female knife, each outer side edge 12a of a male knife 12 (i.e., each outer side edge of each cutter element 18) on one arbor is juxtaposed in closely proximate but non-interfering relation to an outer side edge 12a of a male knife 12 on the other arbor, for cooperation therewith to cut a continuous longitudinal slit in the strip, as indicated at 24. The number of slits thus cut is equal to the number of cooperating pairs of slit-cutting male knife edges 12a acting on the advancing strip 22 across the width of the strip, and the spacing between adjacent slits 24 is determined by the axial length of the male knives. The slits 24 divide the strip into a plurality of narrow strips 26 (shown in FIG. 2, for clarity of illustration, as diverging from the horizontal beyond the slitter), which are of substantially uniform width provided that the male knives 12 are of uniform nominal axial length.

A universal tooling set for the slitter of FIGS. 1 and 2 comprises a plurality of the cutter elements 18, all of which may typically or conveniently have the same nominal axial length (i.e., length measured along the axis of an arbor on which the element is mounted), a multiplicity of male spacer elements 20a, 20b, 20c, etc., and a multiplicity of female spacer elements 21a, 21b, 21c, etc., including plural male and female spacer elements at each of a substantial number of different nominal axial lengths, e.g. a binary sequence of lengths such as 1/64 inch, 1/32 inch, 1/16 inch, ⅛ inch, ¼ inch, etc., together with a series of intermediate lengths, further described below. In the present description, the letters a, b, c, d, etc., following the reference numeral 20 are used to identify spacer elements of respectively different nominal axial lengths. As a general rule, the set includes two elements of each size for each slit it is desired to be able to make; thus, if it is desired to be able to make 30 slits across the width of a metal strip, the set includes about 60 cutter elements, and about 60 male and female spacer elements of each nominal length. A universal tooling set of this type enables the tooling in the slitter to be changed, e.g. to alter the slit spacing (cut narrow strip width) as necessary to fill different orders, by changing the number and/or nominal axial lengths of the female spacer elements that constitute a female knife and of the male spacer elements that are provided between the cutter elements of a male knife.

More particularly, to enable diverse width specifications to be met without resort to expedients such as plastic shims, the tooling set further includes a series of spacers differing from each other in nominal axial length by increments of 1/5 to 1/64 inch, i.e. by increments of 0.0031 inch. For ease of manufacture and stability, these increments are added to a nominal axial length of 1/16 (0.0625) inch; thus, the tooling set includes male and female spacers having each of the following nominal axial lengths:

```
0.0625 + 0.0000 = 0.0625"
0.0625 + 0.0031 = 0.0656"
0.0625 + 0.0062 = 0.0687"
0.0625 + 0.0093 = 0.0718"
0.0625 + 0.0124 = 0.0749"
```

The provision of this series of spacers enables any desired width (spacing between cuts) to be met within a tolerance of ±0.0015 inch, for every set-up wherein the spacing between cutter elements of a male knife is at least 1/16 inch. That is to say, each male and female knife includes a 0.0625 inch spacer, for which a selected one of the above incremental series of spacers is used to meet a desired nominal width specification within a ±0.0015 inch tolerance.

Additionally, since each male knife includes two cutters (all of which have the same nominal axial length), the tooling set further includes female spacer elements having a nominal axial length equal to that of two cutter elements plus twice the desired clearance between cooperating male knife outer edges. For instance, with cutters having a nominal axial length of 0.2500 inch, the tooling set may include female spacer elements having a nominal axial length of 0.5004 inch (providing a nominal knife clearance of 0.0002 inch) and others having a nominal axial length of 0.5010 inch (providing a nominal knife clearance of 0.0005 inch). Stated broadly, the knife clearance should approximate 10% of strip gauge for strip in a "hard" temper and 5% of strip gauge for strip in a "soft" temper; 0.5004 inch or 0.5010 inch spacers are selected for the female knives, to slit strip of a particular gauge and temper, in accordance with this criterion.

In the tooling shown in FIG. 1, three male spacer elements 20a, 20b, and 20c having respectively different nominal axial lengths are provided between the two cutter elements of each male knife, while each female knife 18 consists of four female spacer elements 20a, 20b, 20c, and 20d, of which the first three are respectively identical in nominal axial length to the three spacer elements of each male knife, and the fourth (20d) has a nominal axial length equal to that of two cutter elements, plus twice a desired knife clearance, as mentioned above; thus each female knife will be slightly greater in axial length than the male knife with which it is in register. To set up this tooling on the slitter of FIGS. 1 and 2, a first group of the tooling elements are selected from the universal set to constitute a male knife 12 for mounting on a given axial portion of one of the arbors, and a second group of the elements are selected from the set to constitute a female knife 14 for mounting on a corresponding axial portion of the other arbor in register with the given portion of the one arbor, such that the sum of the nominal axial lengths of the first-group elements corresponds to the desired spacing between slits to be cut and equals the sum of the nominal axial lengths of the second-group elements plus a predetermined value K. In this instance, K is twice the desired knife clearance and is negative, being the difference between the combined nominal axial lengths of the two cutter elements of the male-knife group and the slightly greater nominal axial length of the spacer element $20d$ of the female-knife group. Each selected group consists of a predetermined number of elements; in the tooling as shown, the predetermined number of each male-knife group of elements is five (viz. two cutter elements and three spacer elements), and the predetermined number of each female-knife group of elements is four (viz. four spacers). As thus selected, the first-group and second-group elements are respectively mounted on the given portion of the one arbor and the corresponding portion of the other arbor; and this procedure is repeated in such manner as to provide the described alternating succession of male and female knives on each arbor.

In a slitter of the illustrated type, the magnitude of the knife clearance (axial clearance between the two male knife edges $12a$ of each cooperating pair) is critical for satisfactory slitting; and, of course, there must be at least some positive axial clearance between the edges $12a$ to avoid interference. Typically, for slitting light-gauge aluminum alloy strip, a suitable knife clearance is 0.0005 inch or 0.0002 inch, depending on strip gauge and temper, as explained above. The female knife length $L_f$ should ideally exceed the male knife length $L_m$ by an amount equal to twice the desired knife clearance. On the other hand, an illustrative or typical value of the axial length tolerance to which the individual tooling elements are machined is ±0.0002 inch; tooling having closer tolerances is more costly. To realize the advantages of universal tooling, in enabling set-up to cut slits at any of a substantial variety of different spacings, it is commonly necessary to constitute each male and female knife of a plurality of individual tooling elements, e.g. four or five, as shown in the drawings and described above. Accordingly, with knife clearance requirements and individual tooling length tolerances as exemplified by the above values, ordinary tooling set-up procedures not infrequently result in a difference between the accumulated tolerances on the two arbors sufficient to prevent achievement of proper knife clearances, especially where the tooling is set up to cut a substantial number of slits. It will be understood that the term "accumulated tolerances" refers to the sum of the deviation of the actual axial lengths of the individual elements on an arbor (or on an axial portion of an arbor) from their respective nominal axial lengths; thus, if successive tooling elements on an arbor have individual length deviations (from nominal) of +0.00010, −0.00005, and −0.00015, the accumulated tolerance is −0.00010.

The present invention, particular features of which (in a specific embodiment) will now be set forth, enables simple and assured matching of the tolerances respectively accumulated on the two arbors, thereby to facilitate tooling set-up and to obviate resort to such expedients as field-fit shims to compensate for accumulated tolerance mismatch.

In accordance with the invention, in this embodiment, the overall axial length tolerance range ±t of the individual elements in a universal tooling set is considered as divided into q successive discrete subranges of substantially equal individual extent n (in units of length), where q is an odd integer greater than one. The extent n of each subrange is chosen such that $$[2t/q] \leq n \leq [2t/(q-1)] \quad (1)$$

since the absolute magnitude of the overall tolerance range is 2t, and t and n are absolute values of length. Preferably, the values are so chosen that n is substantially equal to 2t/q, in order that the lower limit of the first subrange is close to −t and the upper limit of the qth subrange is close to +t.

Each subrange is designated by that integer V, between 1 and q, for which the lower limit of the subrange is $$[2(V-1)-q]n/2 \quad (2)$$

and the upper limit of the subrange is $$(2V-q)n/2 \quad (3).$$

Stated in other words, successive subranges (from −t to +t) are respectively designated by consecutive integers V ranging from 1 to q such that V=1 designates the subrange in which −t lies and V=q designates the subrange in which +t lies.

With the sign and absolute magnitude of the deviation $d_e$ of the actual length $A_e$ of an individual tooling element from its nominal axial length $N_e$ defined by $$d_e = A_e - N_e \quad (4),$$

then for each individual tooling element of the universal tooling set, $d_e$ necessarily lies within some one of the above-defined subranges, because the subranges cumulatively encompass the entire overall tolerance range ±t within which $d_e$ must lie if the tooling element meets the manufacturing tolerance specifications. Further in accordance with the invention, the actual axial length of each tooling element of the set is individually measured, for ascertaining the value (sign and absolute magnitude) of its axial length deviation $d_e$, to an accuracy sufficient to determine which one of the aforementioned subranges contains that value of $d_e$. Suitable equipment for making measurements to the requisite accuracy is known and conveniently available; examples of such measuring apparatus are electronic micrometers and laser micrometers.

Once the value of $d_e$ of an element is thus established by measurement, the element is detectably identified with the particular subrange in which its value of $d_e$ lies. For example, each of the elements may be color-coded to indicate the appropriate subrange. Typically, the value of q is less than 10; since there are q subranges, identification of the elements with their respective subranges by color coding is readily feasible. A color-coding spot may, for instance, be applied to the cylindrical periphery of each element, so as not to interfere with the necessary tight endwise abutment of adjacent elements when the tooling is set up. Alternatively, other types of indicia may be used. Since the subranges are designated by integers V, the color coding (or other) indicia serve to detectably assign, to each element, the particular integer V desigating the subrange in which the value of $d_e$ of that element lies.

In this way, every element of the universal tooling set is detectably identified with a particular subrange or integer V. The elements are, of course, also detectably classified (e.g. in a known and conventional manner) by nominal axial length so as to enable ready selection of elements of desired length from the set. Consequently, in addition to the difference in appearance between female spacers (with their polyurethane sleeves) and the other tooling elements, the elements of a tooling set prepared in accordance with the present invention are differentiated both by nominal axial length (in common with conventional universal tooling sets) and by axial length deviation subrange or integer V.

By way of example of the preparation of tooling elements for set-up in accordance with the present invention, in the case of elements machined to an axial length tolerance of ±0.0002 inch (i.e., t=0.0002 inch), a convenient value for q is 7, and a convenient value for n is 0.00006 inch, n being then equal to 2t/q to five decimal places, since 2t/q=0.000057. The subranges (of the overall tolerance range ±0.0002 inch) thus established, the integers V respectively assigned to them, and an illustrative color coding system for identifying them, are given in Table 1 below:

TABLE 1

| Subrange of deviation from nominal axial length (inches) | | Integer (V) | Coding Color |
|---|---|---|---|
| Minimum | Maximum | | |
| −0.00021 | −0.00015 | 1 | Brown |
| −0.00015 | −0.00009 | 2 | Red |
| −0.00009 | −0.00003 | 3 | Orange |
| −0.00003 | +0.00003 | 4 | Yellow |
| +0.00003 | +0.00009 | 5 | Green |
| +0.00009 | +0.00015 | 6 | Blue |
| +0.00015 | +0.00021 | 7 | Violet |

In this series of subranges, the extent of each is n (0.00006 inch), the lower limit of the overall tolerance range (−t=−0.0002 inch) lies in the first subrange, for which V=1, and the upper limit of the overall tolerance range (+t=+0.0002 inch) lies in the last subrange, for which V=q=7, the seven successive subranges being of progressively increasing value.

To classify the tooling elements in the series of subranges set forth in Table 1, the actual axial length of each tooling element is measured, with an electronic micrometer or other suitable device, to the fifth decimal place. Thereby, the sign and magnitude of the deviation $d_e$ of its actual axial length from its nominal axial length are ascertained with sufficient accuracy for determining the particular subrange in which the value of $d_e$ for that element lies. For instance, if the measured actual axial length of an element is 0.00014 inch less than the nominal axial length of that element, $d_e = -0.00014$ inch; the element is thus identified with the subrange (−0.00015 to −0.00009 inch) for which V=2, and is given a red color-coding mark. If an element has a measured actual axial length 0.00007 inch greater than its nominal axial length, $d_e = +0.00007$; the element is identified with the subrange for which V=5, and is given a screen color-coding mark.

The tooling set-up method of the invention involves selecting the aforementioned first and second groups of elements (for mounting, respectively, on a given axial portion of one arbor and on a corresponding portion of the other arbor) not only with reference to their total nominal axial lengths, as already explained, but also to achieve cumulative balancing between the subranges in which the values of $d_e$ of the first-group elements lie and the subranges in which the values of $d_e$ of the second-group elements lie, for limiting the difference D between the total deviations $d_e$ of the first-group elements and the total deviations $d_e$ of the second-group elements to a predetermined range of values of D. To this end, in the described embodiment of the present set-up method, the first-group and second-group elements are selected such that the sum of the integers V assigned to the first-group elements equals the sum of the integers V assigned to the second-group elements.

Since a complete universal tooling set includes, for example as many as sixty tooling elements of each nominal axial length, the subset consisting of elements of any one given nominal length will include a distribution of elements having respectively different assigned integers V. Thus, once the nominal axial lengths of the predetermined number of elements constituting a first or second group have been determined, it is possible to select, at each of those nominal axial lengths, individual elements having assigned integers V adding up to the requisite total. Conveniently, though not necessarily, the selection may be performed with the aid of an appropriately programmed computer having stored information as to the nominal axial lengths and, at each nominal length, the assigned integers V of the elements present in the set. Once the selection is made, the worker who is setting up the tooling identifies the selected elements from the set (by color coding and/or other indicia), and places them in proper sequence on the arbors.

An illustrative instance of this method of setting up tooling in accordance with the invention is the setting up of a first group of tooling elements to constitute a male knife 12 on a given axial portion of the arbor 10 and a second group of tooling elements to constitute a female knife 14 on a corresponding axial portion of the arbor 11 that is in register with the given portion of arbor 10. Initially, the number an type of elements to be included in each group are determined, viz., five (two cutters and three male spacers) in the first group, four (all female spacers) in the second group; the total nominal axial length $N_{tot}(I)$ of the first-group elements is determined, in accordance with the desired spacing between slits to be cut; and the sign and magnitude of the predetermined difference K between $N_{tot}(I)$ and the total nominal axial length $N_{tot}(II)$ of the second-group elements is determined, in accordance with the requisite knife clearance, K being negative in this instance so that $N_{tot}(II)$ will be greater than $N_{tot}(I)$, i.e. so that the axial length of the female knife exceeds that of the male knife.

The nominal axial lengths of the individual elements making up each group are then selected. This selection is exemplified by the set-up shown in FIG. 1 and described above, wherein the first group includes two cutters 18 having identical nominal axial lengths $N_{18}$ and three male spacers, viz. 20a, 20b, and 20c, respectively having nominal axial lengths $N_a$, $N_b$, and $N_c$; and the second group includes three female spacers, 21a, 21b, and 21c, again respectively having the aforementioned nominal axial length $N_a$, $N_b$, and $N_c$, and a fourth female spacer 20d, having a nominal axial length $N_d$ greater by a predetermined amount (the absolute magnitude of K) than $2N_{18}$.

It is then necessary to select, for the first and second groups of elements, particular individual elements (having the above-specified nominal axial lengths) such that the sum $V_{tot}(I)$ of the integers V assigned to the first-group elements equals the sum $V_{tot}(II)$ of the integers V assigned to the second-group elements. As will be understood, although all the cutters 18 in the tooling set have the same nominal axial length $N_{18}$, they differ from each other in size and magnitude of deviation $d_e$ from nominal, and therefore they have different assigned integers V. Similarly, while all the spacers 20a in the set have the same nominal length $N_a$, they have different assigned integers V; and the same is true of each of the other spacers (20b, 20c, 21a, 21b, 21c, 21d, etc.) Therefore, within the specified nominal categories, elements can be chosen having assigned integers V cumulatively satisfying the requirement $V_{tot}(I)=V_{tot}(II)$. An example of such selection follows:

| First Group (male knife) | | | Second Group (female knife) | | |
|---|---|---|---|---|---|
| Element | Nominal | V | Element | Nominal | V |
| 18 | $N_{18}$ | 1 | 21a | $N_a$ | 3 |
| 20a | $N_a$ | 3 | 21b | $N_b$ | 2 |
| 20b | $N_b$ | 2 | 21c | $N_c$ | 3 |
| 20c | $N_c$ | 2 | 21d | $N_d$ | 2 |
| 18 | $N_{18}$ | 2 | | | |
| $V_{tot}(I)$ | | 10 | $V_{tot}(II)$ | | 10 |

With this selection completed, the worker assembling the tooling locates in the tooling set a brown color-coded cutter element 18, an orange-coded spacer element 20a, a red-coded spacer 20b, etc., for the first group, places them on the arbor 10, and similarly locates and mounts (on arbor 11) the specified elements for the second group. As mounted, the male knife constituted by the first-group elements on arbor 10 is in register with, and shorter in axial length than, the female knife constituted by the second-group elements on arbor 11.

Stated generally, the total difference D between the sum $d_{tot}(I)$ of the individual axial length deviations $d_e$ of the first-group elements and the sum $d_{tot}(II)$ of the individual axial length deviations $d_e$ of the second-group elements, in tooling set up by the present method, is within the range of values given by the expression $[(M_2-M_1)(q+1)\pm(M_1+M_2)]n/2$, where $M_1$ and $M_2$ are, respectively, the predetermined numbers of elements in the first and second groups. For n substantially equal to $2t/q$, this range becomes $$[(M_2-M_1)(q+1)\pm(M_1+M_2)]t/q \qquad (5).$$

Thus, D can be restricted to a predetermined range of values, for tooling machined to a given axial length tolerance $\pm t$, by appropriate selection of $M_1$, $M_2$ and q.

Since each tooling element is selected in accordance with its classification in a tolerance subrange having an extent (length) of n, tooling machined to a tolerance of $\pm t$ sets up by the present method with the same precision as conventionally set-up tooling machined to a tolerance of $\pm n/2$, which (for n substantially equal to $2t/q$) is substantially equal to $\pm t/q$.

For setting up an alternating succession of male and female knives on each of two arbors, it is strongly preferred that each first group of elements (for mounting on one arbor) constitute a single knife, e.g. a male knife, and that each second group of elements (for mounting on the other arbor) constitute a single complementary knife, e.g. a female knife, for register with the first-group knife; i.e., it is preferred that a selection of first- and second-group elements with $V_{tot}(I)=V_{tot}(II)$ be made for each individual male-female knife pair, in order to assure proper knife clearance. The actual axial length of an individual knife is directly dependent on the magnitude of $V_{tot}(I)$ or $V_{tot}(II)$ for the group of elements constituting that knife; for instance, the actual length $L_m$ of a male knife constituted of a first group of elements set up by the above-described method of the invention is within the range of values given by the expression $$N_{tot}(I) + \left[ V_{tot}(I) - M_1\left(\frac{q+1}{2}\right) \right] n \pm M_1 n/2.$$

Accordingly, it is also preferred that the value of $V_{tot}(I)$ (to which $V_{tot}(II)$ is equal) for successive knives increase progressively from one end of the arbors to the other. That is to say, considering the view shown in FIG. 1, it is preferred that the value of $V_{tot}(I)$ or $V_{tot}(II)$ for any given knife on an arbor be equal to or less than the value of $V_{tot}(I)$ or $V_{tot}(II)$ for any knife disposed to the right of the given knife on the arbor. This arrangement affords a proper buildup of accumulated tolerances along the arbor, with only an acceptably slight variation in spacing between slits across the width of the web of sheet material to be cut, and enables setting up of tooling to meet the requirement $V_{tot}(I)=V_{tot}(II)$ for each of multiple male-female knife pairs from a universal tooling set having a conventional number of elements and tolerance distribution.

Figure 3C:
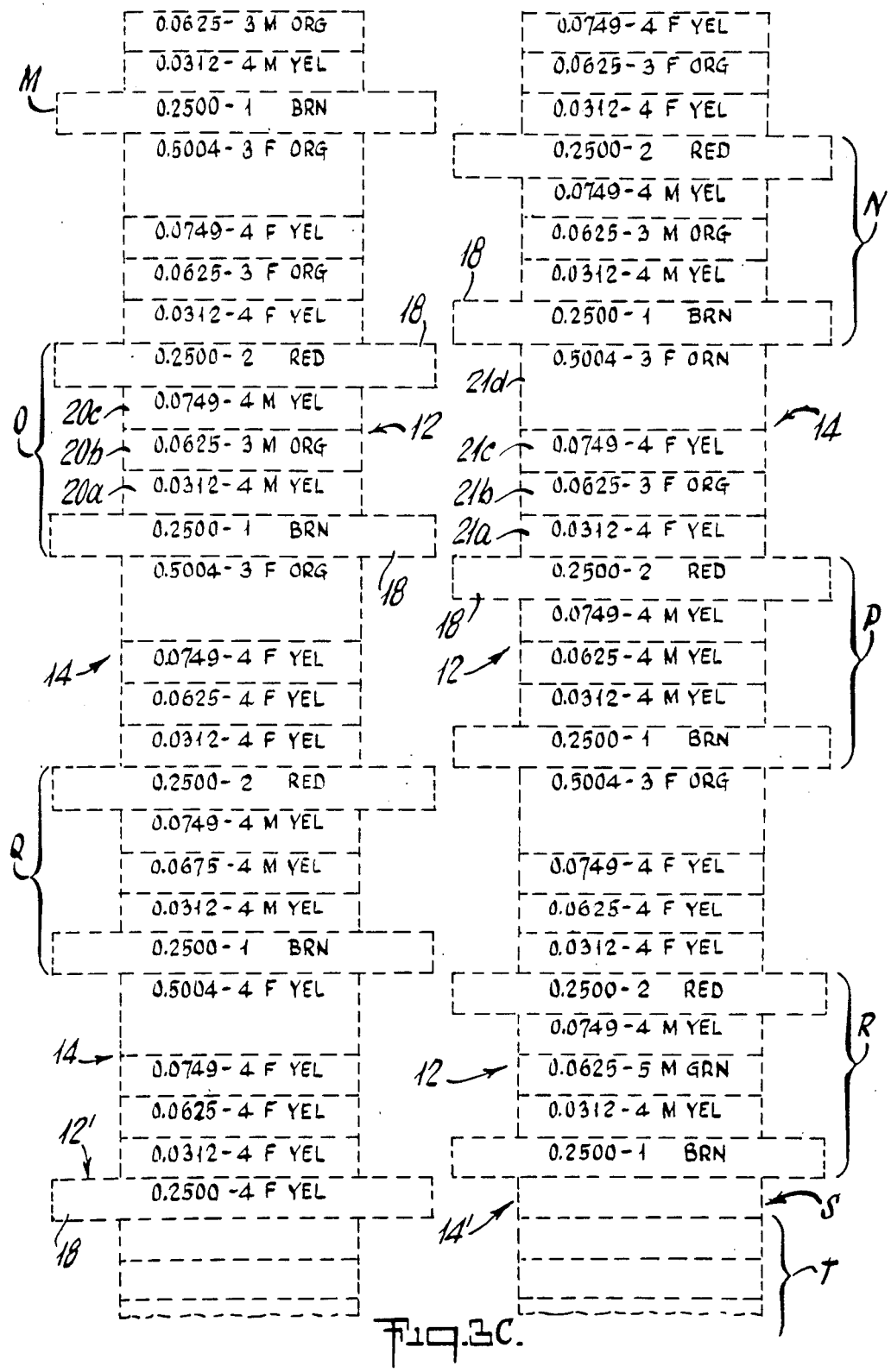

The invention will be further illustrated by the following specific example, with reference to FIGS. 3A, 3B, and 3C:

EXAMPLE

FIGS. 3A-3C together constitute a diagram or chart for a complete tooling set-up, in a slitter of the type shown in FIGS. 1 and 2, for slitting a 12-inch-wide strip of aluminum alloy sheet, in H temper, at a gauge of 0.0025 inch, into sixteen narrow strips each 0.6700 inch wide (leaving trim or scrap, from the side edges of the sheet, totalling 1.279 inches in width). In this example, the knife clearance is 0.0002 inch, the individual tooling elements used are machined to a tolerance of $\pm 0.0002$ inch, and the tolerance subranges, assigned integers V, and color coding are as given in Table 1 above.

This set-up employs the following types of elements from a universal tooling set:

| Description | Reference Numeral | Nominal axial length (in.) |
|---|---|---|
| cutter | 18 | 0.2500 |
| spacer | 20a or 21a | 0.0312 |
| " | 20b or 21b | 0.0625 |
| " | 20c or 21c | 0.0749 |
| " | 21d | 0.5004 |
| " | 20e or 21e | 3.0000 |
| " | 20f or 21f | 0.7500 |
| " | 21g | 0.2502 |

In the chart (FIGS. 3A-3C), which illustrates diagrammatically the position of every tooling element on each arbor from one end of the arbor through the knife closest to the other end of the arbor, each element is identified by a block outline (the wider blocks being the cutters), and within the outline, by nominal axial length, assigned integer V, identification as an element of a male (M) or female (F) knife (for spacers only), and color coding. The cutters, of course, are always elements of male knives.

At one end of the two arbors (top of FIG. 3A), the first and second groups of elements respectively set up on the facing arbor end portions (and collectively designated A in FIG. 3A) are each constituted of four long spacers used as centering spacers for the array of knives, viz. three spacers 20e or 21e and one spacer 20f or 21f. For these initial first and second groups, $V_{tot}(I)=V_{tot}(II)=7$, $M_1=M_2=4$, and $K=0$, i.e. $N_{tot}(I)=N_{tot}(II)=9.75$ inches.

Immediately beyond these spacer groups, a first male knife 12' consisting of a single cutter 18 is mounted on the arbor 10, and a first female knife 14' consisting of a single spacer 21g is mounted in register therewith on the arbor 11. Considering this single cutter and spacer as a first and second group of elements (collectively designated B), respectively, $V_{tot}(I)=V_{tot}(II)=2$, $M_1=M_2=1$, and $K=-0.0002$ inch, i.e. $N_{tot}(I)=0.2500$ inch and $N_{tot}(II)=0.2502$ inch.

The next successive first and second groups of elements (collectively designated C in FIG. 3A) constitute a two-cutter, three-spacer male knife 12 on arbor 11 (first group) and a four-spacer female knife 14 in register therewith on arbor 10 (second group), wherein $V_{tot}(I)=V_{tot}(II)=6$, $M_1=5$, $M_2=4$, and $K=-0.0004$ inch, i.e. $N_{tot}(I)=0.6686$ inch and $N_{tot}(II)=0.6690$ inch.

The immediately following paired (first and second) groups of elements (collectively designated D) constitute a male knife 12 on arbor 10 and a female knife 14 on arbor 11. This sequence is repeated, in paired groups E through R, to provide a total of sixteen male-female knife pairs so arranged that each arbor bears an alternating succession of male and female knifes respectively in register with the female and male knives on the other arbor. For each of these sixteen pairs of groups (C through R), the values of $M_1$, $M_2$, K, $N_{tot}(I)$, and $N_{tot}(II)$ are the same, i.e., as given above for paired group C, but the values of $V_{tot}(I)$ (and $V_{tot}(II)$) increase progressively along the length of the arbor. Specifically, for paired groups D, $V_{tot}(I)=6$; for each of paired groups E and F, $V_{tot}(I)=8$; for paired groups G, $V_{tot}(I)=9$, and so forth, until for each of paired groups P and Q, $V_{tot}(I)=15$, and for paired groups R, $V_{tot}(I)=16$. The tooling set-up beyond paired groups R is a mirror image of paired groups A and B, viz. a single-cutter male knife 12' on arbor 11 in register with a single-spacer female knife 14' on arbor 10 (paired group S), and a final pair of groups of long spacers serving as centering spacers (paired groups T).

The diagram or chart of FIGS. 3A–C, which may be in the form of a computer printout, is designed to be used as a guide by the person actually assembling the tooling on the arbors, identifying (by nominal length and color coding) the individual tooling elements to be chosen from the universal tooling set and placed on the arbors in the designated sequence.

It is to be understood that the invention is not limited to the procedures and embodiments hereinabove specifically set forth, but may be carried out in other ways without departure from its spirit.

I claim:

1. In a method of setting up tooling on two axially parallel driven rotary arbors for cutting plural parallel longitudinal slits on a web of sheet material advancing between the arbors in a direction transverse to the axes of the arbors, using a set of tooling comprising a multiplicity of circular tooling elements individually mountable on either arbor and including cutter elements and spacer elements, each tooling element of said set having a predetermined nominal axial length and an actual axial length deviating from its nominal length within a tolerance range of $\pm t$, where t is an absolute value of length, said method including the steps of (a) selecting a first group of said tooling elements from the set for mounting on a given axial portion of one of the arbors, and a second group of elements from the set for mounting on a corresponding axial portion of the other arbor in register with said given axial portion of said one arbor, such that the sum of the nominal axial lengths of the first-group elements equals the sum of the nominal axial lengths of the second-group elements plus a predetermined value K, said first group consisting of a predetermined number of elements and said second group consisting of a predetermined number of elements, and (b) mounting the first-group elements and the second-group elements respectively on the given portion of the one arbor and on the corresponding portion of the other arbor, the improvement which comprises (c) each of the tooling elements of the set being detectably identified with one of a plurality of defined, discrete, successive subranges of said tolerance range $\pm t$, in accordance with the sign and absolute magnitude of the deviation $d_e$ between a measured value of actual axial length of the element and the nominal axial length of the element, said subranges being so defined that the value of $d_e$ of any given element of the set lies within one of said subranges, and each element of the set being identified as aforesaid with that one of said subranges in which its value of $d_e$ lies, and (d) the selecting step including selecting, as the elements of said first and second groups, elements identified as aforesaid with particular ones of said subranges such that the subranges with which the first-group elements are identified cumulatively balance the subranges with which the second-group elements are identified for limiting the difference D between the sum of the values $d_e$ of the first-group elements and the sum of the values $d_e$ of the second-group elements to a predetermined range of values of D.

2. A method according to claim 1, wherein said first-group elements are selected to constitute a male knife comprising a pair of cutter elements spaced apart by at least one of the spacer elements, and wherein said second-group elements are selected to constitute a female knife, comprising at least one of the spacer elements, dimensioned for register with said male knife.

3. A method according to claim 1, wherein said given portion of said one arbor is at one extremity of said one arbor, and wherein the selecting and mounting steps are repeated, for successive axial portions of the arbors, until a complete array of tooling has been mounted over the full length of the arbors.

4. A method according to claim 3, wherein said complete array of tooling constitutes a plurality of male knives and a plurality of female knives disposed in alternating succession on each arbor, such that the male knives on one arbor are in register with the female knives on the other arbor, and wherein each female knife and the male knive in register therewith are set up by performing the aforesaid selecting and mounting steps with the first-group elements selected to constitute the male knife and the second-group elements selected to constitute the female knife.

5. A method according to claim 4, wherein the value of K is less than zero for each first group of elenents selected to constitute a male knife.

6. A method according to claim 4, wherein each first group of elements selected to constitute a male knife comprises a pair of the cutter elements spaced apart by a plurality of the spacer elements, and wherein each second group of elements selected to constitute a female knife comprises a plurality of the spacer elements.

7. A method according to claim 1, wherein said subranges are substantially equal to each other in extent, expressed as units of length.

8. A method according to claim 7, wherein the number of said subranges is q; wherein successive ones of said subranges of progressively increasing value are respectively designated by consecutive integers V ranging from 1 to q such that V=1 designates the subrange including $d_e = -t$ and V=q designates the subrange including $d_e = +t$; wherein to each element of the set there is assigned that integer V which designates the subrange in which the value $d_e$ of the element lies; and wherein the step of selecting elements identified with particular subranges comprises selecting the elements of the first and second groups such that the sum of the integers V assigned to the first-group elements equals the sum of the integers V assigned to the second-group elements.

9. A method according to claim 8, wherein the extent of each subrange is substantially equal to 2t/q; wherein $M_1$ and $M_2$ respectively designate the numbers of elements in the first and second groups; wherein q is an odd integer; and wherein the values of q, $M_1$ and $M_2$ are selected such that $[(M_2-M_1)(q+1)\pm(M_1+M_2)]t/q$ substantially coincides with said predetermined range of D values.

10. A method according to claim 1, wherein each of said elements bears a visible indication of the subrange with which it is identified.

11. A method of preparing a set of tooling for setting up on two axially parallel driven rotary arbors for cutting plural parallel longitudinal slits in a web of sheet material advancing between the arbors in a direction transverse to the axes of the arbors, said set of tooling comprising a multiplicity of circular tooling elements individually mountable on either arbor and including cutter elements and spacer elements, each tooling element of said set having a predetermined nominal axial length and an actual axial length deviating from its nominal length within a tolerance range of $\pm t$, where t is an absolute value of length, said method comprising (a) measuring the actual axial length of each tooling element of the set for determining the sign and absolute magnitude of the deviation $d_e$ between the actual and nominal axial lengths of the element, to enable differentiation of the determined deviations $d_e$ of the elements of the set into at least q discrete, successive subranges of the tolerance range $\pm t$, where q is an integer greater than 1, and said subranges are substantially equal to each other in extent;

(b) assigning, to each measured element, an integer V within a set of consecutive integers ranging from 1 to q, by respectively designating successive ones of said subranges of progressively increasing value by successively larger integers V such that V=1 designates the subrange including $d_3 = -t$ and V=q designates the subrange including $d_e = +t$, and determining the integer V to be assigned to any given measured element as that integer V designating the subrange within which the deviation $d_e$ of the given element lies; and (c) providing each element of the set with a detectable indication of the integer V assigned to it, thereby to enable elements to be selected from the set in accordance with their respective assigned integers V.

12. A method of setting up tooling for two axially parallel driven rotary arbors for cutting plural parallel longitudinal slits in a web of sheet material advancing between the arbors in a direction transverse to the axes of the arbors, said set of tooling comprising a multiplicity of circular tooling elements individually mountable on either arbor and including cutter elements and spacer elements, each tooling element of said set having a predetermined nominal axial length and an actual axial length deviating from its nominal length within a tolerance range of $\mp t$, where t is an absolute value of length, said method comprising (a) measuring the actual axial length of each tooling element of the set for determining the sign and absolute magnitude of the deviation $d_e$ between the actual and nominal axial lengths of the element, to enable differentiation of the determined deviations $d_e$ of the elements of the set into at least q discrete, successive subranges of the tolerance range $\pm t$, where q is an integer greater than 1, and said subranges are substantially equal to each other in extent;

(b) assigning, to each measured element, an integer V within a set of consecutive integers ranging from 1 to q, by respectively designating successive ones of said subranges of progressively increasing value by successively larger integers V such that V=1 designates the subrange including $d_e = -t$ and V=q designates the subrange including $d_e = +t$, and determining the integer V to be assigned to any given measured element as that integer V designating the subrange within which the deviation $d_e$ of the given element lies;

(c) providing each element of the set with a detectable indication of the integer V assigned to it, thereby to enable elements to be selected from the set in accordance with their respective assigned integers V;

(d) selecting a first group of said tooling elements from the set for mounting on a given axial portion of one of the arbors, and a second group of elements from the set for mounting on a corresponding axial portion of the other arbor in register with said given axial portion of said one arbor, such that the sum of the nominal axial lengths of the first-group elements equals the sum of the nominal axial lengths of the second-group elements plus a predetermined value K, and such that the sum of the integers V assigned to the first-group elements equals the sum of the integers V assigned to the second-group elements, said first group consisting of a predetermined number of elements and said second group consisting of a predetermined number of elements, and (e) mounting the first-group elements and the second-group elements respectively on the given portion of the one arbor and on the corresponding portion of the other arbor.

* * * * *